Figure 1:
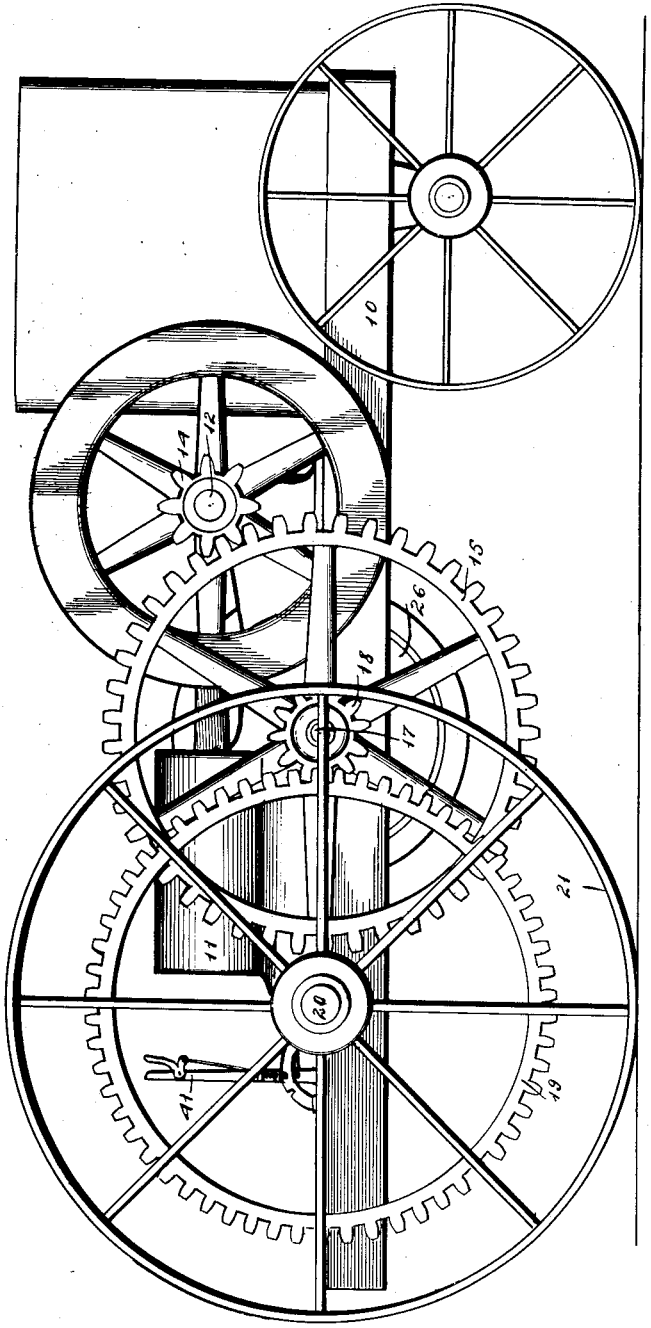

F. J. WOOD.
GEARING DEVICE FOR TRACTION ENGINES.
APPLICATION FILED JAN. 12, 1911.

1,096,338.

Patented May 12, 1914.
4 SHEETS—SHEET 1.

Witnesses
A. G. Hague.
W. A. Loftus.

Inventor
Franz J. Wood.
by J. Ralph Druig atty

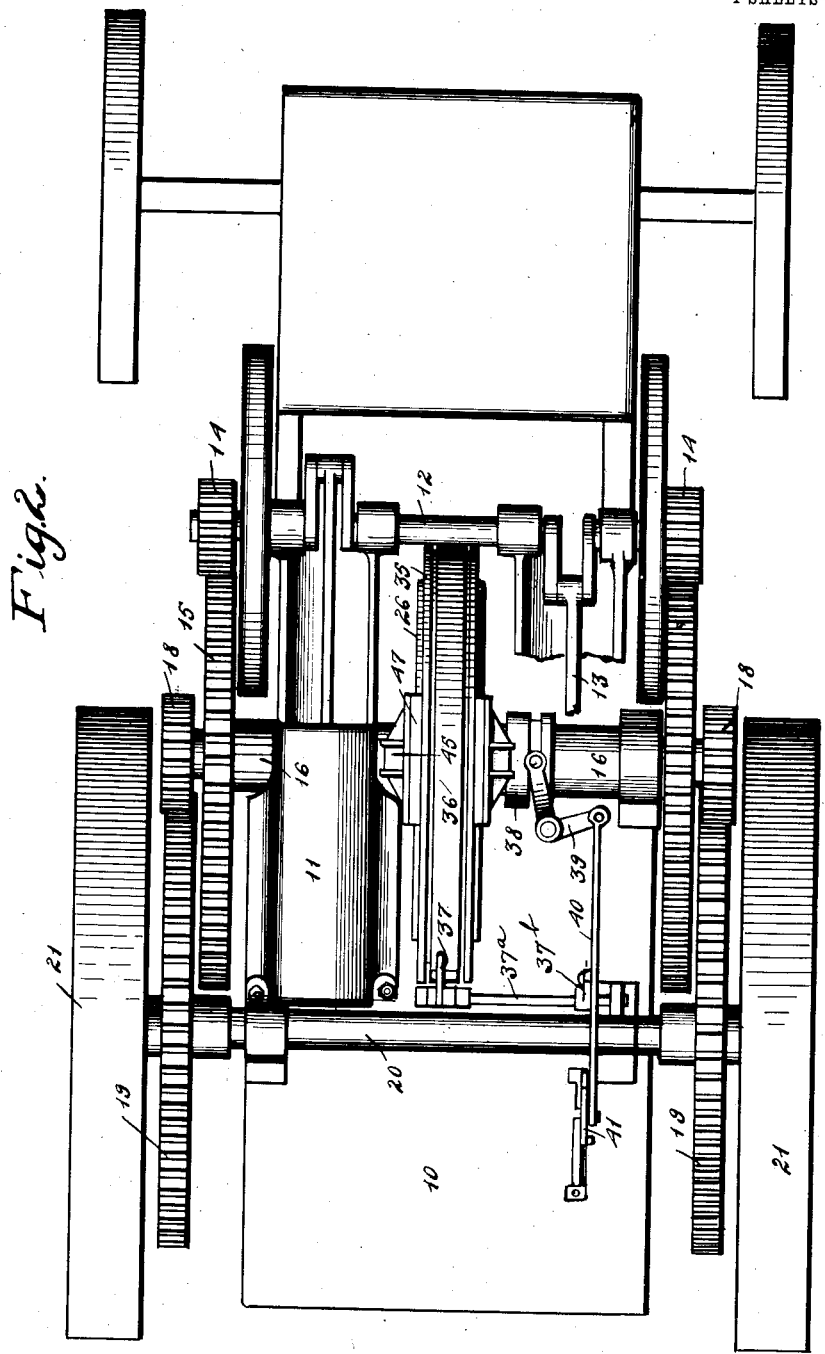

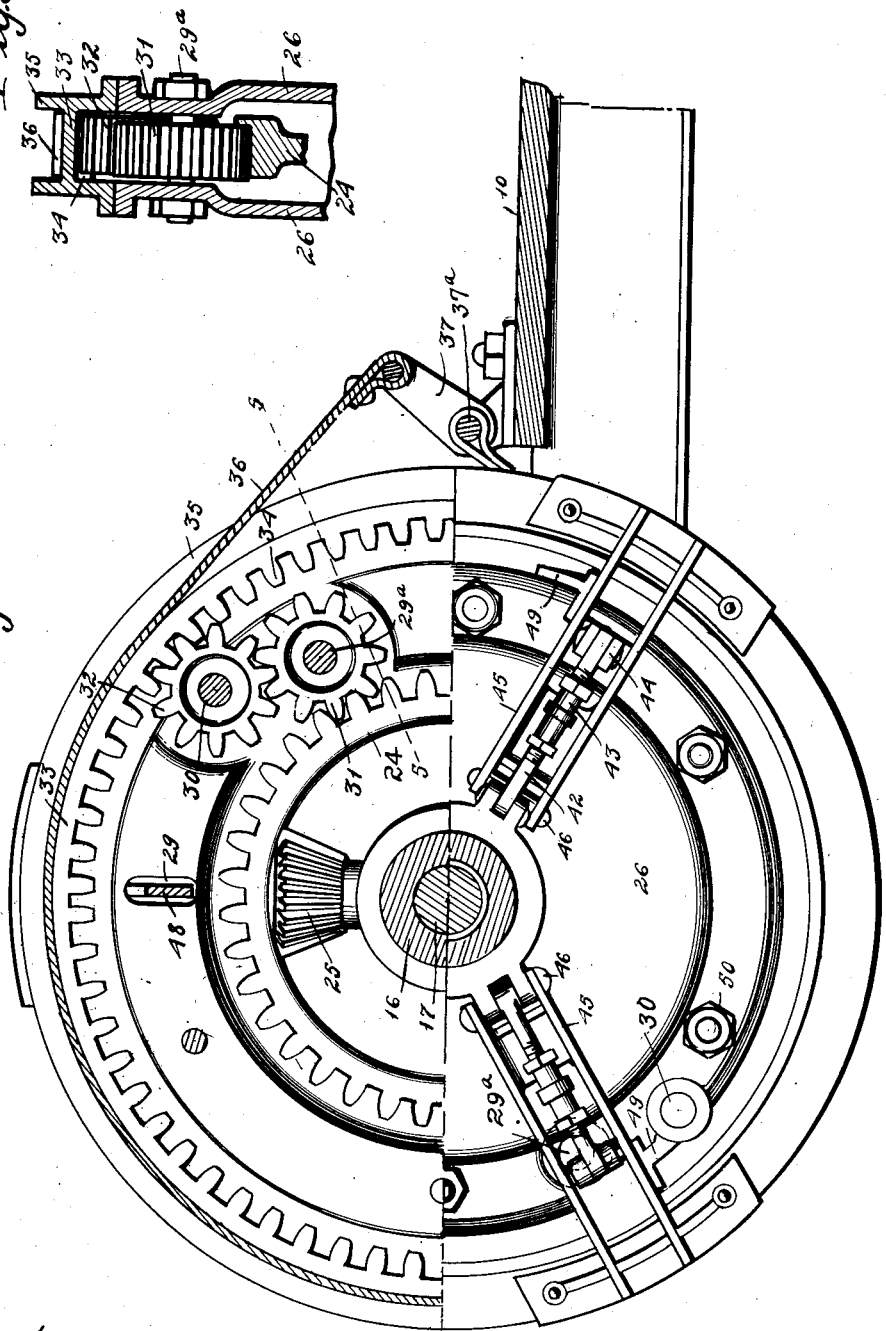

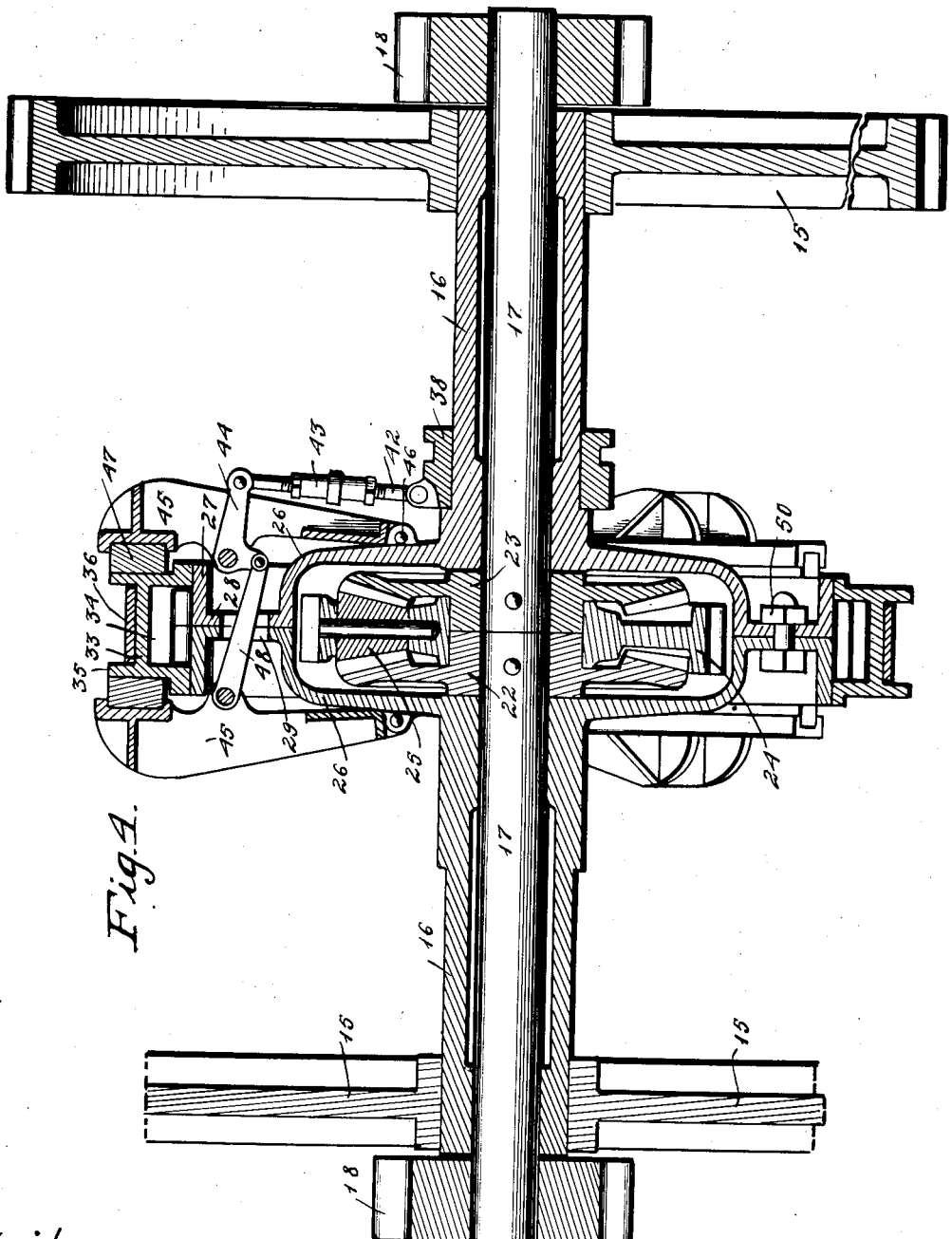

UNITED STATES PATENT OFFICE.

FRANZ J. WOOD, OF DES MOINES, IOWA, ASSIGNOR TO WOOD BROTHERS THRESHER COMPANY, OF DES MOINES, IOWA, A CORPORATION OF IOWA.

GEARING DEVICE FOR TRACTION-ENGINES.

1,096,338.    Specification of Letters Patent.    Patented May 12, 1914.

Application filed January 12, 1911. Serial No. 602,151.

*To all whom it may concern:*

Be it known that I, FRANZ J. WOOD, a citizen of the United States, residing at Des Moines, in the county of Polk and State of Iowa, have invented a certain new and useful Gearing Device for Traction-Engines, of which the following is a specification.

My invention relates to certain new and useful improvements in the means for transmitting power from an internal combustion engine to the traction wheels of a traction engine.

My object is to provide a gearing device of compact, strong and durable construction in which I have combined a clutch mechanism, a reverse mechanism, and a differential gear.

A further object is to provide a gearing device of this class in which the cog wheels may all be inclosed in a suitable casing to protect the cog wheels from dust and to permit them to be thoroughly lubricated with hard grease oil, or the like so that they will operate noiselessly and be protected from excessive wear.

A further object is to provide a gearing device of this kind in which an internal combustion engine may be speeded up and the clutch mechanism applied by frictional contact so that power may be applied to the traction wheels slowly and gradually; and also to provide means for throwing the reverse gearing mechanism in which the power may be applied by friction slowly and gradually.

My invention consists in certain details, in the construction, arrangement and combination of the various parts of the device, whereby the objects contemplated are attained, as hereinafter more fully set forth, pointed out in my claims and illustrated in the accompanying drawings, in which:

Figure 1 shows a side elevation of a traction engine embodying my invention and illustrating particularly the means for transmitting power from the engine shaft to the driving axle. Fig. 2 shows a top or plan view of same. Fig. 3 shows an enlarged, detail, side view of the combined clutch mechanism, the reverse mechanism and differential gear, the casing being removed from the upper portion of said figure. Fig. 4 shows a vertical, transverse, central, sectional view through my improved gearing device and illustrating the countershaft and gear wheels adjacent to said gearing device, and Fig. 5 shows a detail, sectional view through the casing of my improved gearing device illustrating the shape of the casing surrounding the small pinions by which the movement of the countershaft is reversed.

Referring to the accompanying drawings, I have used the reference numeral 10 to indicate the frame of the traction engine and 11 an internal combustion engine carried thereby. Mounted on the engine frame is the driving shaft 12 operatively connected to the engine 11 by the pitman 13. On the ends of the driving shaft are the pinions 14 which are in mesh with the large gear wheels 15. These large gear wheels are fixed to sleeves 16 which are rotatably mounted on the countershaft 17. This countershaft is divided at its center to receive a differential gearing device hereinafter described. On the ends of the countershaft are the pinions 18 which are in mesh with the large gear wheels 19 on the rear or driving axle 20 of the traction engine. The traction wheels 21 are also fixed to this rear axle. By means of the double gearing device power is applied from the driving shaft to both ends of the rear axle and the differential gear is on a countershaft and not on the rear axle so that the strength of the rear axle is not impaired by having the differential gear applied to it. The advantages of this particular form of gearing device are fully set forth in United States Letters Patent, Number 978,977, issued to me on December 20, 1910, and hence need not be herein more fully described.

My improved clutch, reverse and differential gearing device comprises two beveled gear wheels 22 and 23 fixed respectively on the adjacent ends of the countershaft 17. Rotatably mounted on the hubs of said beveled gears is a gear wheel 24 having a toothed periphery. The gear wheel 24 carries a series of beveled pinions 25 of ordinary construction in mesh with the beveled pinions 22 and 23 thus forming a differential gearing device of the ordinary construction that can be operated in the ordinary way. Rotatably mounted upon the countershaft 17 are the two sleeves 16 before described, each of which has on its inner end a casing member 26. This casing is of a size to completely inclose the differential gearing device before described and is provided with a flange 27 at its periphery. At a number of points, preferably three, the sides of the casing are brought together beyond the differential gearing device, as shown at 28 in Fig. 4, and openings 29 are extended through the parts 28 to receive links as will hereinafter appear. At a point between two of the depressions 28, I have mounted the shafts 29ª and 30 in the sides of the casing 26 and on one of these shafts I have fixed a small pinion 31 in mesh with the gear wheel 24 of the differential gearing device and on the other is a smaller pinion 32 which is in mesh with the pinion 31 and out of engagement with the gear wheel 24. These pinions 31 and 32 are both wholly inclosed within the casing 26 as illustrated in the detail view shown in Fig. 5. A similar set of pinions 31 and 32 are provided at the opposite side of the casing, the shafts only being shown. Rotatably mounted upon the periphery of the flange 27 is an annular, flat rim 33 having a series of internal cog teeth 34 and also having at its sides the radially extended flanges 35 which slidingly rest upon the flange 27 and hold the rim 33 spaced apart from said flange 27. The teeth of the pinion 32 are in mesh with these internal cog teeth 34. The said flanges 35 project beyond the periphery of the rim 33 to form guides for a hand brake 36 which is extended around the periphery of the rim 33 and which has its ends connected to a lever 37 mounted on the frame, as shown in Fig. 3, so that the said band brake may be tightened or loosened on the rim 33 by a manipulation of said lever. This lever is fixed to a shaft 37ª which is connected by a crank 37ᵇ to the controlling lever 41 hereinafter described.

In order to provide for clutching the rim 33 to the casing 26, I have mounted on one of the sleeves 16 a sliding collar 38 controlled by a bell crank lever 39 which is connected to a link 40 and said link is attached to the controlling lever 41 on the machine frame. A number of gripping devices, preferably three, are provided to be operated by the said sliding collar 38. Each gripping device comprises a rod 42 pivoted to the collar 38, and preferably provided with a turn-buckle 43 for adjusting its length. The outer end of the rod 42 is pivoted to a bell crank lever 44, which lever is fulcrumed to the adjacent one of a pair of clamping jaws 45. These clamping jaws are pivoted at 46 to opposite sides of the casing 26 and they are provided with brake shoes 47 at their outer ends designed to frictionally engage the sides of the flanges 35. The two jaws 45 are opposite each other and are connected by a link 48 pivoted at one end to the bell crank lever 44 and at the other end to the opposite one of the clamping jaws 45, the central portion of the link 48 being extended through the adjacent slot 29 in the casing 26. As before stated there are preferably three pairs of these gripping jaws and they are arranged at points approximately equidistant from each other. By this arrangement a movement of the collar 38 toward the center of the countershaft 17 will have the effect of drawing the gripping jaws 45 toward each other at their outer ends to thereby frictionally hold the rim 33 to the casing 26 so that the rim will be carried around with the casing.

In order to support the gripping jaws 45 in their radially extended positions, I have provided on the casing 26 a series of lugs 49 designed to engage one side of each gripping jaw in such a manner as not to interfere with the inward and outward movement of the jaw but to firmly hold the jaw in its position when the brake shoes are in engagement with the flanges 35 and a considerable amount of power is being applied by the casing to the flanges 35. The two parts of the casing 26 are firmly held together at suitable intervals by bolts 50 as illustrated at the bottom in Fig. 4.

In practical use, and assuming that it is desired to start the traction engine in a forward direction, then the internal combustion engine is first started in the ordinary way and permitted to attain a considerable speed. The band brake 36 is previously released. Then the operator manipulates the controlling lever 41 in such a manner as to bring the brake shoes 47 gradually into frictional engagement with the flanges 35. So long as the brake shoes are out of engagement with said flanges the casing 26 and the sleeve 16 will rotate freely without moving the countershaft 17 because the pinions 31 and 32 will run idle and simply travel around the gear wheel 24 without driving it. As soon however as the gripping jaws engage the flanges 35, then the rim 33 will be clutched to the casing 26 and will move around it. This will cause the pinions 32 and 31 to act upon the gear wheel 24 in such a manner as to drive the countershaft 17 in a direction for moving the traction engine forwardly. Obviously by means of this friction clutch mechanism power may be applied to the countershaft 17 slowly and gradually and it may be readily and easily applied and released as required in starting the traction engine in such a manner as to avoid sudden shocks or jars to the traction engine. When it is desired to reverse the movement of the traction engine, the operator may, without stopping the movement of the power shaft 12, first manipulate the controlling lever 41 in such a manner as to permit the gripping jaws 45 to release from the flanges 35, whereupon the power from the internal combustion engine will cease to be applied to the driving axle. Then the operator may, by manipulating the lever 41, slowly and gradually in the opposite direction, apply the band brake to the rim 33. This will cause said rim to be gripped and held stationary so that, as the casing 26 rotates the pinions 31 and 32 around with it, the stationary gear teeth 34 on the rim 33 will cause said pinions 32 and 31 to transmit power to the gear wheel 24 in a reverse direction.

By my improved construction, it will be seen that, when the traction engine is being moved either forwardly or rearwardly, the gearing device is clutched by a friction clutch so that power may be applied slowly and gradually in starting in either direction, and in the event that the advance of the traction engine is suddenly impeded the said frictional clutch devices may slip to prevent breakage of the gearing mechanism. Furthermore the differential gearing device operates in its ordinary manner when the traction engine is moving either forwardly or rearwardly.

One of the advantageous features of my improved device is that the clutch mechanism, the reverse mechanism and the differential gear are all arranged in very compact and simple form within a single casing device so that all the gearing devices are protected from dust and dirt and may be thoroughly lubricated, thus minimizing wear and preventing noise. Another advantageous feature is that the friction clutch devices are all on the exterior of the casing where they are readily and easily accessible to the operator.

I claim as my invention:

1. In a gearing device of the class described, the combination of a rotatable member, two pinions carried thereby and in mesh with each other, a gear wheel in mesh with one of said pinions, a driven shaft operatively connected with the said gear wheel, an internal gear capable of rotation independently of said rotatable member and in mesh with the other one of said pinions, means for rotating the said rotatable member, means for retarding the rotation of said internal gear, and a friction clutch for operatively connecting said rotatable member and said internal gear.

2. In a gearing device of the class described, the combination of a shaft, a sleeve and casing mounted thereon and forming a rotatable member, two pinions carried by said rotatable member and in mesh with each other, a gear wheel on said shaft in mesh with one of said pinions, an internal gear capable of rotation independently of said rotatable member and in mesh with the other one of said pinions, means for rotating the said rotatable member, and frictional means for retarding the rotation of the internal gear, and adjustable means for operatively connecting said rotatable member and said internal gear.

3. In a gearing device of the class described, the combination of a rotatable member, two pinions carried thereby and in mesh with each other, a gear wheel in mesh with one of said pinions, a driven shaft operatively connected with the said gear wheel, an internal gear capable of rotation independently of said rotatable member and in mesh with the other one of said pinions, means for rotating the said rotatable member, means for retarding the rotation of said internal gear, and means for connecting said rotatable member and said internal gear.

4. In a gearing device of the class described, the combination of a rotatable member, two pinions carried thereby and in mesh with each other, a gear wheel in mesh with one of said pinions, a driven shaft operatively connected with the said gear wheel, an internal gear capable of rotation independently of said rotatable member and in mesh with the other one of said pinions, means for retarding the said rotatable member, means for retarding the rotation of said internal gear, and frictional means for connecting said rotatable member and said internal gear.

5. In a gearing device of the class described, the combination of a rotatable driving member, two pinions carried by said rotatable driving member and in mesh with each other, a gear wheel in mesh with one of said pinions, a driven shaft connected with said gear wheel, an internal gear in mesh with the other one of said pinions, a gripping device carried by said rotatable member to engage said internal gear, a stationary support and a second gripping device connected to said stationary support to also engage said internal gear.

6. In a gearing device of the class described, the combination of a rotatable driving member, two pinions carried by said rotatable driving member and in mesh with each other, a gear wheel in mesh with one of said pinions, a driven shaft connected with said gear wheel, an internal gear in mesh with the other one of said pinions, a frictional gripping device carried by said rotatable member to engage said internal gear, a stationary support, and a gripping device connected to said stationary support to also engage said internal gear.

7. In a gearing device of the class described, the combination of a rotatable driving member, two pinions carried by said rotatable driving member and in mesh with each other, a gear wheel in mesh with one of said pinions, a driven shaft connected with said gear wheel, an internal gear in mesh with the other one of said pinions, a gripping device carried by said rotatable member to engage said internal gear, a stationary support and a frictional gripping device connected to said stationary support to also engage said internal gear.

8. In a gearing device of the class described, the combination of a rotatable driving member, two pinions carried by said rotatable driving member and in mesh with each other, a gear wheel in mesh with one of said pinions, a driven shaft connected with said gear wheel, an internal gear in mesh with the other one of said pinions, a frictional gripping device carried by said rotatable member to engage said internal gear, a stationary support, and a second frictional gripping device connected to said stationary support to also engage said internal gear.

9. In a gearing device of the class described, the combination of a frame, a rotatable driving member, two pinions carried thereby in mesh with each other, a rim having internal gear teeth rotatably mounted on said rotatable member, a frictional gripping device carried by the rotatable member to engage said rim, a stationary support, a frictional gripping device fixed to said stationary support to also engage said rim, the teeth of said rim being in mesh with one of said pinions, a driven shaft, a cog wheel connected to the driven shaft and in mesh with the other one of said pinions, and means for transmitting power from said driven shaft.

10. In a gearing device of the class described, the combination of a rotatable casing, a divided shaft within said casing, a differential gear device within said casing and comprising two beveled gears fixed to the adjacent ends of the divided shaft, and a gear wheel rotatably mounted relative to the beveled gears, two pinions also inclosed in said casing in mesh with each other and one being in mesh with the gear wheel of the differential gear device, a rim having internal gear teeth rotatably mounted relative to the casing and in mesh with the other one of said pinions, means carried by the rotatable casing for gripping said rim to the rotatable casing, and means for holding said rim against rotation.

11. In a gearing device of the class described, the combination of a rotatable driving member, two pinions carried by said rotatable driving member and in mesh with each other, a differential gear device including a gear wheel in mesh with one of said pinions, a driven shaft connected with said gear wheel, an internal gear in mesh with the other one of said pinions, a gripping device carried by said rotatable member to engage said internal gear, a stationary support and a second gripping device connected to said stationary support to also engage said internal gear, and said driven shaft being divided into two parts, both of said parts being connected to the differential gear device.

12. In a gearing device of the class described, the combination of a rotatable driving member, two pinions carried by said rotatable driving member and in mesh with each other, a differential gear device including a gear wheel in mesh with one of said pinions, a driven shaft connected with said gear wheel, an internal gear in mesh with the other one of said pinions, a frictional gripping device carried by said rotatable member to engage said internal gear, a stationary support, a gripping device connected to said stationary support to also engage said internal gear, and said driven shaft being divided into two parts, both of said parts being connected to the differential gear device.

13. In a gearing device of the class described, the combination of a rotatable driving member, two pinions carried by said rotatable driving member and in mesh with each other, a differential gear device including a gear wheel in mesh with one of said pinions, a driven shaft connected with said gear wheel, an internal gear in mesh with the other one of said pinions, a gripping device carried by said rotatable member to engage said internal gear, a stationary support, a frictional gripping device connected to said stationary support to also engage said internal gear, and said driven shaft being divided into two parts, both of said parts being connected to the differential gear device.

14. In a gearing device of the class described, the combination of a rotatable driving member, two pinions carried by said rotatable driving member, and in mesh with each other, a differential gear wheel including a gear wheel in mesh with one of said pinions, a driven shaft connected with said gear wheel, an internal gear in mesh with the other one of said pinions, a frictional gripping device carried by said rotatable member to engage said internal gear, a stationary support, a second frictional gripping device connected to said stationary support to also engage said internal gear, and said driven shaft being divided into two parts, both of said parts being connected to the differential gear device.

15. In a gearing device, a countershaft divided into two parts, a casing rotatably mounted on said countershaft provided with a flange at its periphery, means for driving the casing, a differential gearing inclosed in said casing and comprising two beveled pinions fixed to the opposite parts of the countershaft and also comprising a gear wheel, two shafts carried by the gear casing, two pinions on said shafts in mesh with each other, one of them being also in mesh with said gear wheel, a rim having internal teeth rotatably mounted upon said flange, said rim being in mesh with the other one of said pinions, a clutch device for connecting said rim to said casing comprising a number of pairs of gripping jaws pivoted to the casing and having clutch shoes to engage the sides of said rim, a sleeve slidingly mounted, a controlling lever for the sleeve, a bell crank lever pivoted to one of the jaws of each pair, a rod connected to each bell crank lever and to said sliding sleeve, a link connected to each bell crank lever extended through the casing and connected to the other free jaw of the pair, a stationary support, a lever fixed to said stationary support, a band brake connected to it and extended around the periphery of said rim, and means for transmitting power from the countershaft.

16. In a gearing device, the combination of a countershaft divided into two parts, a casing rotatably mounted on said countershaft provided with a flange at its periphery, means for driving the casing, a differential gearing inclosed in said casing and comprising two beveled pinions fixed to the opposite parts of the countershaft and also comprising a gear wheel, two shafts carried by the gear casing, two pinions on said shafts in mesh with each other, one of them being also in mesh with said gear wheel, a rim having internal teeth rotatably mounted upon said flange, said rim being in mesh with the other one of said pinions, a clutch device for connecting said rim to said casing comprising a number of pairs of gripping jaws pivoted to the casing and having clutch shoes to engage the sides of said rim, a sleeve slidingly mounted, a controlling lever for the sleeve, a bell crank lever pivoted to one of the jaws of each pair, a rod connected to each bell crank lever and to said sliding sleeve a link connected to each bell crank lever extended through the casing and connected to the other free jaw of the pair, a stationary support, a lever fixed to said stationary support, a band brake connected to it and extended around the periphery of said rim, and independent means for operatively connecting each part of the countershaft to a corresponding driven device.

Des Moines, Iowa, December 31, 1910.

FRANZ J. WOOD.

Witnesses:
M. WALLACE,
M. PETERSON.